United States Patent Office 3,534,113
Patented Oct. 13, 1970

3,534,113
PREPARATION OF ARYLLITHIUM COMPOUNDS BY METALATION
Jerome F. Eastham, Knoxville, Tenn., and Constantinos G. Screttas, Gastonia, N.C., assignors to Lithium Corporation of America, New York, N.Y., a corporation of Delaware
No Drawing. Filed Feb. 8, 1968, Ser. No. 707,020
Int. Cl. C07f 1/02; C07d 29/00, 27/00
U.S. Cl. 260—665
12 Claims

ABSTRACT OF THE DISCLOSURE

Process of metalating aromatic hydrocarbon compounds, such as benzene or toluene, comprising reacting the aromatic hydrocarbon with an organolithium compound, such as n-butyllithium, in the presence of an ether, such as tetrahydrofuran, the ratio of the lithium in said organolithium compound to the ether being 1 gram atom of the lithium to from 0.25 to 4 gram moles of the ether.

---

Our invention relates to improvements in the preparation of aryllithium compounds.

The lithium metalation of aromatic hydrocarbons has heretofore been proposed. Thus, for instance, benzene, toluene, and naphthalene have been metalated with n-butyllithium in various tertiary amines, in diethyl ether, in tetrahydrofuran (THF) and in mixtures thereof as solvents, but the yields have been unsatisfactory.

Our invention is predicated on the discovery that, through certain controlled use of the foregoing and other ethers in the manner hereafter described, benzene can be metalated to phenyllithium, toluene to benzyllithium, naphthalene to naphthyllithium, and other aromatic hydrocarbons to other aromatic organolithium compounds in good yields ranging from 70–100% based on butyllithium and other organolithiums used for these metalations.

The ethers which catalyze these metalations are represented by linear alkyl ethers such as dimethyl ether, diethyl ether, diisopropyl ether, di-n-butyl ether and diisobutyl ether; dialkyl ethers of aliphatic polyhydric alcohols such as dimethyl ether of ethylene glycol, diethyl ether of ethylene glycol, diisopropyl ether of ethylene glycol and diisopropyl ether of diethylene glycol, and dimethyl-, diethyl- and diisopropyl ethers of propylene glycol; cyclic alkyl ethers such as tetrahydrofuran (THF), tetrahydropyran (THP), dioxane, and 7-oxa [2,2,1]-bicycloheptane (OBH); and liquid ethers in the form of azaoxa-alkanes, aza-alkyloxacycloalkanes or oxa-alkylazacycloalkanes which can be represented by the formulae (I) 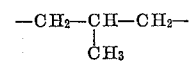

(II) 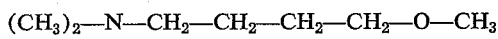

(III) 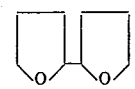

(IV) 

(V) 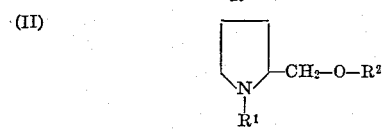

where $R^1$, $R^2$ and $R^3$ are the same or different alkyls each containing from 1 to 4 carbon atoms, namely, methyl, ethyl, n-propyl, isopropyl, n-butyl, isobutyl and t-butyl; X is a non reactive group such as —$CH_2$—$CH_2$—, —$CH_2$—$CH_2$—$CH_2$—, $$-CH_2-CH-CH_2-$$
$$\phantom{-CH_2-}CH_3$$

or other divalent aliphatic hydrocarbon or alkylene radicals, preferably containing from 2 to 4 carbon atoms; and $n$ is 1 to 4. Illustrative examples of such ethers include, for instance, 2-dimethylaminoethylmethyl ether $(CH_3)_2$—N—$CH_2$—$CH_2$—O—$CH_3$; 2-diethylaminoethylmethyl ether $(C_2H_5)_2$—N—$CH_2$—$CH_2$—O—$CH_3$; and 2-dimethylaminopropylmethyl ether $$(CH_3)_2-N-CH_2-CH_2-CH_2-CH_2-O-CH_3$$

An illustrative dioxacycloalkane is

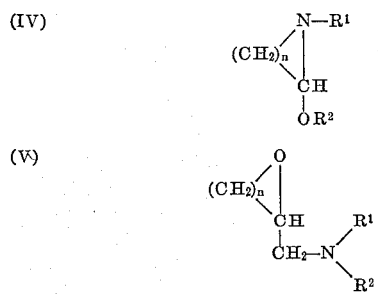

For achievement of the results obtained pursuant to our present invention, the proportions of the ethers to be added to the organolithium compounds employed in these metalations fall within the range of 0.25 to 4 gram moles of ether per gram atom of lithium contained in the organolithium compound. It appears that coordination complexes are formed by the interaction of the ethers with the alkyllithium compounds employed. Thus, for example, after mixing the ether 7-oxabicyclo [2,2,1] heptane (OBH) with a hydrocarbon solution of n-butyllithium (BuLi), a solid complex, OBH:BuLi, can be crystallized from the solution.

The ethers are generally cleaved by organolithium compounds, thus consuming them and decreasing the yields obtained in the metalation process. This loss of ethers to the cleavage reaction can be substantially avoided by keeping the reaction temperature low, controlling the ratio of ether to organolithium compound, using ethers which are not easily cleaved, and using ethers which are particularly effective in activating the compound. Depending upon the particular organolithium compounds utilized, particular control of temperature of the metalation reaction is important for best results. Thus, very reactive organolithium compounds as, for instance, secondary alkyllithiums and tertiary alkyllithiums, can be used to metalate unreactive aromatic hydrocarbons in good yield because the ether, necessary to catalyze the reaction, is not itself consumed if the temperature chosen is sufficiently low. At higher temperatures, even at room temperatures in some cases, the catalyst is consumed more rapidly than is the aromatic hydrocarbon metalated.

In general, it is preferred to operate at temperatures not exceeding 30° C. and, better still, at temperatures in the range of −20° C. to 25° C.

The organolithium compound employed as the metalating agent is most desirably an alkyllithium compound such as ethyllithium, n-propyllithium, isopropyllithium, n-butyllithium, isobutyllithium, sec-butyllithium, tert-butyllithium, n-amyllithium, isoamyllithium, n-octyllithium, isooctyllithium, and the like, particularly an alkyllithium containing from 2 to 6 carbon atoms. However, it may also be cycloalkyllithium compound, such as cyclohexyllithium or methylcyclohexyllithium; or it may be an aryllithium compound when the latter, for instance, is employed as the metalating agent for the production of aralkyllithium compounds, and among such aryllithium compounds are, for example, phenyllithium, tolyllithium, and phenylethyllithium. Still other types of organolithiums are heterocyclics such as 2-pyridyllithium and 2-lithiothiophene; and unsaturated organolithiums such as vinyllithium, allyllithium, crotonyllithium and propenyllithium. Again, polylithio-organic compounds, including dilithiodienes, exemplified by 1,4-dilithiobutane; 1,5-dilithiopentane; dilithioisoprene; dilithiobutadiene and other dilithio adducts of other conjugated polyene hydrocarbons. Of specal importance are the butyllithiums, particularly secondary butyllithium.

Aromatic hydrocarbons which can be metalated in accordance with our present invention include, by way of example, benzene, toluene, biphenyl and polyphenyls and their derivatives, o-, m- and p-xylenes, mesitylene, durene, and polymethylbenzenes and polymethylpolyphenyl compounds in general; alkylbenzenes such as ethylbenzene and isopropylbenzene and alkyl and polyalkylpolyphenyls in general; naphthalene and methyl- and ethyl-naphthalenes. Still other aromatic hydrocarbon derivatives which can be metalated by the process of our invention are trialkyl and triarylsilyl benzenes, dialkylaminobenzenes, and alkyl phenyl ethers. For example, metalation of trimethylsilylbenzene leads to a 90% yield of a mixture of trimethylsilylbenzoic acid on carbonation of which 75% is the meta isomer. Analogously, metalation of dimethylaniline permits a 70% yield of O-dimethylaminophenyldiphenylcarbinol on reaction with benzophenone. Of particular importance are benzene, toluene, naphthalene, methylnaphthalenes, and biphenyl.

In carrying out the process of our invention, generally speaking, the organolithium compound is dissolved in an inert organic solvent, particularly a saturated aliphatic hydrocarbon solvent, and added to a solution of the ether in (a) the aromatic hydrocarbon to be metalated or in (b) a mixture of the aromatic hydrocarbon to be metalated plus another saturated aliphatic hydrocarbon diluent under an inert gas. The reaction mixture is stirred and cooled, if necessary, until the reaction is complete. Derivatization of the metalated aromatic hydrocarbons is accomplished by carbonation to the respective organic carboxylic acids or by bromination to the respective organic bromides. Various inert organic solvents can be utilized as, for instance, pentane, hexane, heptane, octane and isooctane, as well as mixtures thereof. In some cases, an excess of the aromatic hydrocarbon to be metalated can be used as solvent.

The reaction temperatures utilized are subject to quite wide variation although, for the reasons pointed out above, namely, to avoid or reduce cleavage of the ethers by the organolithium compound, it is distinctly desirable in most cases to operate at relatively low temperatures. Generally speaking, reaction temperatures may range from −20° C. or even lower to as high as 80° C. or even somewhat higher. The particular organolithium compound utilized, the particular aromatic hydrocarbon to be metalated, and the particular ether utilized will all influence the selection of the particular temperature or range of temperatures at which optimum yields of the desired aryllithium compounds are obtained.

The following examples are given, by way of illustration, of practicing the process of our invention. It will be understood that numerous other examples will readily occur to those skilled in the art in the light of the novel guiding principles and teachings disclosed herein.

EXAMPLE 1

6.5 ml. of a 1.6 M solution of n-butyllithium and containing 0.01 gram atoms of lithium in hexane was added with stirring to a solution of 1.44 g. (0.02 gram moles) tetrahydrofuran (THF) in 30 ml. of benzene. The solution was stirred for 48 hours at 27° C. The reaction mixture produced was carbonated by pouring it into a dry ice-ether slurry. After workup, the derived acid product was analyzed by NMR spectroscopy and found to contain benzoic acid corresponding to a 73% yield of phenyllithium based on starting n-butyllithium.

EXAMPLE 2

0.01 gram moles of tert-butyllithium in n-pentane (1.5 M) and containing 0.01 gram atoms of lithium, and 0.02 gram moles of dimethyl ether were mixed with 100 ml. of toluene and stirred for two hours at −10 to −15° C. After carbonation and workup, a 79% yield of phenylacetic acid was obtained.

Other metalations which have been carried out and conditions of the process and results are set out below. The Ether: BuLi ratio is expressed in gram moles of the ether to gram atoms of the lithium contained in the butyllithium.

METALATION OF TOLUENE WITH n-BUTYLLITHIUM (BuLi)

| Ex. | Added ether | Ether: BuLi ratio | Reaction time, hrs. | Reaction temp., ° C. | Phenylacetic acid yield, percent |
|---|---|---|---|---|---|
| 3 | THF | 2:1 | 48 | 25 | 73 |
| 4 | Dimethyl ether | 1:1 | 2 | −15−−10 | 79 |
| 5 | THF | 1:1 | 2 | −15−−10 | 77 |

In Example 3, the reaction solution was about 0.2 M in BuLi and 8 M in toluene, with the remainder being the ether and hexane solvent. In Examples 4 and 5, the reaction solution was about 0.25 M in BuLi. The phenylacetic acid yield was obtained by taking the metalation reaction mixture, after the indicated reaction time, and pouring it onto solid carbon dioxide slurried in diethyl ether.

EXAMPLE 6

Metalation of benzene with t-butyllithium (t-BuLi)

Added ether _____ THF
Ether: BuLi ratio _____ 1:1
Reaction time (hr.) _____ 2
Reaction temp. (° C.) _____ −15−−10
Benzoic acid yield (percent) _____ 79

In Example 6, the reaction solution was about 0.25 M in t-BuLi and 8 M in benzene. The benzoic acid yield was obtained in the same way as described in Examples 3, 4 and 5 in regard to phenylacetic acid.

The folllowing example is illustrative of the preparation of preformed complexes, of the charatcer described above, and, here again, in the light of the novel guiding principles and teaching disclosed herein, the preparation of numerous other complexes will readily suggest themselves to those skilled in the art.

EXAMPLE 7

To a centrifuge tube containing 5 ml. of pentane was added 3.1 ml. of n-butyllithium (0.005 gram atoms of lithium) from a 1.6 M solution in hexane and 0.4 ml. (0.004 gram moles of 7-oxabicyclo [2,2,1] heptane (OBH). No precipitate was formed at room temperature. On cooling to −5° C., crystals were formed which redissolved upon warming above 0° C. The crystalline precipitate was spun down at low temperature and the supernatant was withdrawn. The precipitate was washed with two 5 ml. portions of cold pentane and recrystallized from 5 ml. of pentane, all in the centrifuge tube. Finally the precipitate was dissolved in 0.4 ml. of anhydrous benzene and this solution was analyzed by NMR spectrometry. The integrated signals of the methine protons of the ether and the protons of the methylene group adjacent to lithium indicated a ratio of n-butyllithium to OBH equal to one.

EXAMPLE 8

To a reaction flask containing 400 ml. of a 2.52 N (1 gram atom of lithium) solution of sec-butyllithium in benzene 160 ml. of tetrahydrofuran was added dropwise to the stirred solution at −20° C. to 0° C. during a period of 50 minutes. The reaction flask was then immersed in an insulated container with crushed Dry Ice so that the temperature of the stirred solution was kept at −10±5° C. for 36 hours. At the end of this period the lightly yellow solution was 1.87 N in total base and 1.82 N in active base. The yield of phenyllithium was 97%. An aliquot of said solution was treated with an excess of trichloromethylsilane and the mixture was analyzed by VPC. The yield based on the VPC-peak of the phenyltrimethylsilane was 100%.

EXAMPLE 9

To a solution of 0.2 mole of sec-butyllithium in 180 ml. of toluene, there was added slowly 40 ml. of tetrahydrofuran at −15±1° C. When about ¾ of the tetrahydrofuran had been added, the temperature rose rapidly to 0° C. and the entire mixture froze into a yellow crystalline mass. The remainder of the tetrahydrofuran was added at once and the solution was allowed to attain room temperature at which time most of the solid went into solution. Addition of 10 ml. of tetrahydrofuran solubilized the entire precipitate. Oxidimetric titration indicated a normality of 0.76 (theoretical 0.80). The yield of benzyllithium was 95%.

EXAMPLE 10

To a 250 ml. three-necked flask equipped with reflux condenser, magnetic stirrer and thermometer, previously purged with nitrogen, was added 50 ml. of benzene followed by 2 ml. of ca 90% n-butyllithium. Titration with sec-BuOH 9,10-phenanthroline of a 5 ml. aliquot of this solution indicated a normality of 0.47. Two ml. of 2-dimethylamino methyltetrahydrofuran was added. The mixture was then heated to reflux during a period of 10 minutes. Reflux was continued for 20 minutes longer and then the mixture was cooled rapidly to 25° C. Titration of a 5 ml. aliquot showed that the solution was 0.38 N in active lithium. Carbonation of the entire reaction mixture, followed by workup and recovery gave 1.52 g. of benzoic acid M.P. 115–117° C. Thus, the yield based on titration was 81% and 63% based on carbonation.

We claim:
1. A process for the preparation of aryllithium compounds which comprises metalating an aromatic hydrocarbon with an organolithium compound in the presence of an ether, the ratio of the lithium in said organolithium compound to the ether being 1 gram atom of lithium to from 0.25 to 4 gram moles of the ether.
2. A process according to claim 1, wherein the ratio of the lithium in said organolithium compound to the ether is 1 gram atom of lithium to from 1 to 2 gram moles of the ether.
3. A process according to claim 1, wherein the temperature at which the metalation is conducted is not above 30° C.
4. A process according to claim 2, wherein the organolithium compound in the form of a solution in an inert organic solvent is added to a solution of the ether in the aromatic hydrocarbon to be metalated.
5. A process according to claim 3, wherein the organolithium compound is an alkyllithium.
6. A process according to claim 3, wherein the ether is a linear alkyl ether or a cyclic alkyl ether.
7. A process according to claim 3, wherein the ether is 7-oxabicyclo [2,2,1] heptane.
8. A process according to claim 4, wherein the inert organic solvent is at least one selected from the group pentane, hexane and heptane.
9. A process according to claim 5, wherein the ether is a linear alkyl ether or a cyclic alkyl ether.
10. A process according to claim 9, wherein the alkyllithium is sec-butyllithium and the aromatic hydrocarbon to be metalated is benzene or toluene.
11. A process according to claim 1, wherein the reaction is carried out in an inert liquid hydrocarbon medium.
12. A process according to claim 5, wherein the alkyllithium contains from 2 to 6 carbon atoms.

References Cited

UNITED STATES PATENTS 3,197,516    7/1965    Esmay _____ 260—665

OTHER REFERENCES

Eastham, et al.: J. Am. Chem. Soc. 85 (1963), pp. 2171–2.
Talalaeva et al.: Chem. Abst. 51 (1957) (col. 1962).
Kirk: Othmer Encyclopedia of Chemical Technology, vol. 12 (1967), Interscience Publishers, New York, N.Y., pp. 550–1.
Gilman et al.: J. Org. Chem. 23 (1958), pp. 1476–9.

HELEN M. McCARTHY, Primary Examiner
A. P. DEMERS, Assistant Examiner

U.S. Cl. X.R.
260—269, 313.1, 333, 345.1, 346.1